United States Patent
Koyanagi et al.

(10) Patent No.: US 9,292,439 B2
(45) Date of Patent: Mar. 22, 2016

(54) METHOD, DEVICE AND COMPUTER PROGRAM FOR IDENTIFYING ITEMS HAVING HIGH FREQUENCY OF OCCURRENCE AMONG ITEMS INCLUDED IN A TEXT DATA STREAM

(71) Applicant: International Business Machines Corporation, Armonk, NY (US)

(72) Inventors: Teruo Koyanagi, Tokyo (JP); Takayuki Osogami, Kanagawa-ken (JP); Raymond Harry Rudy, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 13/799,951

(22) Filed: Mar. 13, 2013

(65) Prior Publication Data

US 2013/0275677 A1    Oct. 17, 2013

(30) Foreign Application Priority Data

Apr. 17, 2012 (JP) .................................. 2012-094026

(51) Int. Cl.
*G06F 12/08* (2006.01)
*H04L 12/26* (2006.01)
(Continued)

(52) U.S. Cl.
CPC ............... *G06F 12/08* (2013.01); *G06F 17/18* (2013.01); *G06F 17/30619* (2013.01); *H04L 43/022* (2013.01); *H04L 43/16* (2013.01)

(58) Field of Classification Search
CPC ... G06F 12/08; G06F 17/30619; H04L 43/16; H04L 43/022
See application file for complete search history.

(56) References Cited

U.S. PATENT DOCUMENTS 8,386,717 B1 * 2/2013 Banerjee et al. ............... 711/136
8,682,864 B1 * 3/2014 Plevyak et al. ............... 707/688
(Continued)

FOREIGN PATENT DOCUMENTS

JP   10-260881 A   9/1998
JP   2004-164611 A   6/2004
(Continued)

OTHER PUBLICATIONS

G.S. Manku, Rajeev Motwani, "Approximate frequency counts over data streams", VLDB 2002.
(Continued)

*Primary Examiner* — Edward Dudek, Jr.
(74) *Attorney, Agent, or Firm* — Scully, Scott, Murphy & Presser, P.C.; Jeff Tang, Esq.

(57) ABSTRACT

A method, device and computer program for efficiently identifying items having a high frequency of occurrence among items included in a large-volume text data stream. Identification information for identifying an item and a count of items are stored in a higher level of memory and only identification information is stored in a lower level. Text data stream input is received, the increment of the count of an item is increased in response to storage in the higher level memory of identification information for an item included in a bucket divided from the received text data stream input, identification information for the item is transferred with the initial count to the higher level of memory in response to storage in the lower level and the identification information for the item is newly stored with the initial count in the higher level in response to not being stored on any level.

20 Claims, 7 Drawing Sheets

(51) Int. Cl.
 *G06F 17/30* (2006.01)
 *G06F 17/18* (2006.01)

(56) References Cited

U.S. PATENT DOCUMENTS

| | | | |
|---|---|---|---|
| 8,725,779 B1* | 5/2014 | Grzywinski et al. | 707/812 |
| 2009/0183037 A1 | 7/2009 | Hamaguchi et al. | |
| 2010/0049700 A1* | 2/2010 | Dimitropoulos et al. | 707/4 |
| 2011/0107042 A1* | 5/2011 | Herron | 711/161 |

FOREIGN PATENT DOCUMENTS

| | | |
|---|---|---|
| JP | 2004-240985 A | 8/2004 |
| JP | 2008-159047 A | 7/2008 |
| JP | 2009-212770 A | 9/2009 |

OTHER PUBLICATIONS

Rong et al., "Mnemonic lossy counting: an efficient and accurate heavy-hitters identification algorithm", IPCCC 2010.

Dimitropoulos et al., "Probabilistic lossy counting: an efficient algorithm for finding heavy hitter", ACM SIGCOMM 2008.

Ikada et al., "Improved Approximate Frequency Counts Algorithm based on "Lossy Counting"", IEICE technical report, Japan, The Institute of Electronics, Information and Communication Engineers, Feb. 28, 2008, with English language Abstract.

* cited by examiner $$f_h + \Delta_h = 1000$$
$$\downarrow$$
$$b = \frac{1000}{20} = 50$$

FIG. 6A $$f_h + \Delta_h = 100000$$
$$\downarrow$$
$$b = \frac{100000}{20} = 5000$$

FIG. 6B

METHOD, DEVICE AND COMPUTER PROGRAM FOR IDENTIFYING ITEMS HAVING HIGH FREQUENCY OF OCCURRENCE AMONG ITEMS INCLUDED IN A TEXT DATA STREAM

CROSS-REFERENCE TO RELATED APPLICATION

This application claims priority under 35 U.S.C. §119 from Japanese Patent Application No. 2012-094026 filed Apr. 17, 2012, the entire contents of which are incorporated herein by reference.

BACKGROUND OF THE INVENTION

The invention relates to the field of computer systems. More specifically, a method, device and computer program for efficiently identifying items having a high frequency of occurrence among items included in a text data stream.

Usually, when approximately identifying the frequency of occurrence for an item included in a text data stream of continuously inputted items, the number of occurrences has to be counted and stored for each item. As a result, the required memory capacity is enormous. A well-known algorithm for improving memory efficiency is lossy counting (LC). LC is an approximate calculation method in which the memory is divided into two levels, one for items with a high frequency of occurrence and one for all other items.

In prior art, LC is used in order to divide the memory into two levels according to the frequency of occurrence for items included in a data stream and to reduce memory usage by excluding items with a frequency of occurrence below a predetermined value from the count. By providing a memory structure with multiple levels, memory can be used efficiently when items with a high frequency of occurrence are to be identified.

However, when the LC technique is used, memory usage increases logarithmically relative to the data length of items. Therefore, when both the amount of data in a data stream and the number of items with a high frequency of occurrence is enormous, items with a high frequency of occurrence cannot be identified with accuracy using the LC technique due to, for example, insufficient memory capacity. Also, considering the fact that the LC technique can only divide memory into two levels, this technique cannot fully exploit multi-level cache memory that has different memory capacities and access times. Therefore, when multi-level cache memory is used, which is common in current computer systems, the frequency of occurrence is not calculated efficiently by the LC technique because the performance of the multiple-level cache memory cannot be fully exploited.

Therefore, improvements to prior art are still desired to solve the above-mentioned one or more problems in prior art.

SUMMARY OF THE INVENTION

Accordingly, one aspect of the present invention is a computer implemented method for identifying items having a high frequency of occurrence among items included in a text data stream, wherein the computer includes a processor communicatively coupled to a memory with a plurality of levels, which stores identification information for identifying an item and a count of items in a higher level of the memory and stores only identification information in a lower level of the memory, the method including the steps of: receiving text data stream input; reading each item and counting the number of occurrences for each item in a bucket divided from the received text data stream input; increasing the increment of the count of an item in response to storage in the higher level memory of identification information for an item included in the bucket divided from the received text data stream input; transferring identification information for the item along with the initial count to the higher level of memory in response to storage in the lower level of memory; and newly storing the identification information for the item along with the initial count in the higher level of memory in response to not being stored on any level.

Another aspect of the present invention is a device for identifying items having a high frequency of occurrence among items included in a text data stream, including: a memory with a plurality of levels, which stores identification information for identifying an item and a count of items in a higher level of the memory and stores only identification information in a lower level the memory; an input receiving means for receiving text data stream input; and a storage memory controlling means for increasing the increment of the count of an item in response to storage in the higher level memory of identification information for an item included in a bucket divided from the received text data stream input, for transferring identification information for the item along with the initial count to the higher level of memory in response to storage in the lower level of memory and for newly storing the identification information for the item along with the initial count in the higher level of memory in response to the item not being stored on any level.

Another aspect of the present invention provides a system for identifying items having a high frequency of occurrence among items included in a text data stream the system including:

a memory with a plurality of levels, which stores identification information for identifying an item and a count of items in a higher level of the memory and stores only identification information in a lower level of memory below the higher level of memory;

a processor in communication with the memory; and a module for executing the functions of:

an input receiving means for receiving text data stream input; and a storage memory controlling means:

for increasing the increment of the count of an item in response to storage in the higher level memory of identification information for an item included in a bucket divided from the received text data stream input;

for transferring identification information for the item along with the initial count to the higher level of memory in response to storage in the lower level of memory; and for newly storing the identification information for the item along with the initial count in the higher level of memory in response to not being stored on any level.

BRIEF DESCRIPTION OF THE DRAWINGS

FIG. 6A is a diagram illustrating the process for determining whether or not an item has been transferred from the highest level memory to a lower level memory.

FIG. 6B is a diagram illustrating the process for determining whether or not an item has been transferred from the highest level memory to a lower level memory using a different equation than that of FIG. 6A.

DETAILED DESCRIPTION OF THE PREFERRED EMBODIMENTS

Figure 1:
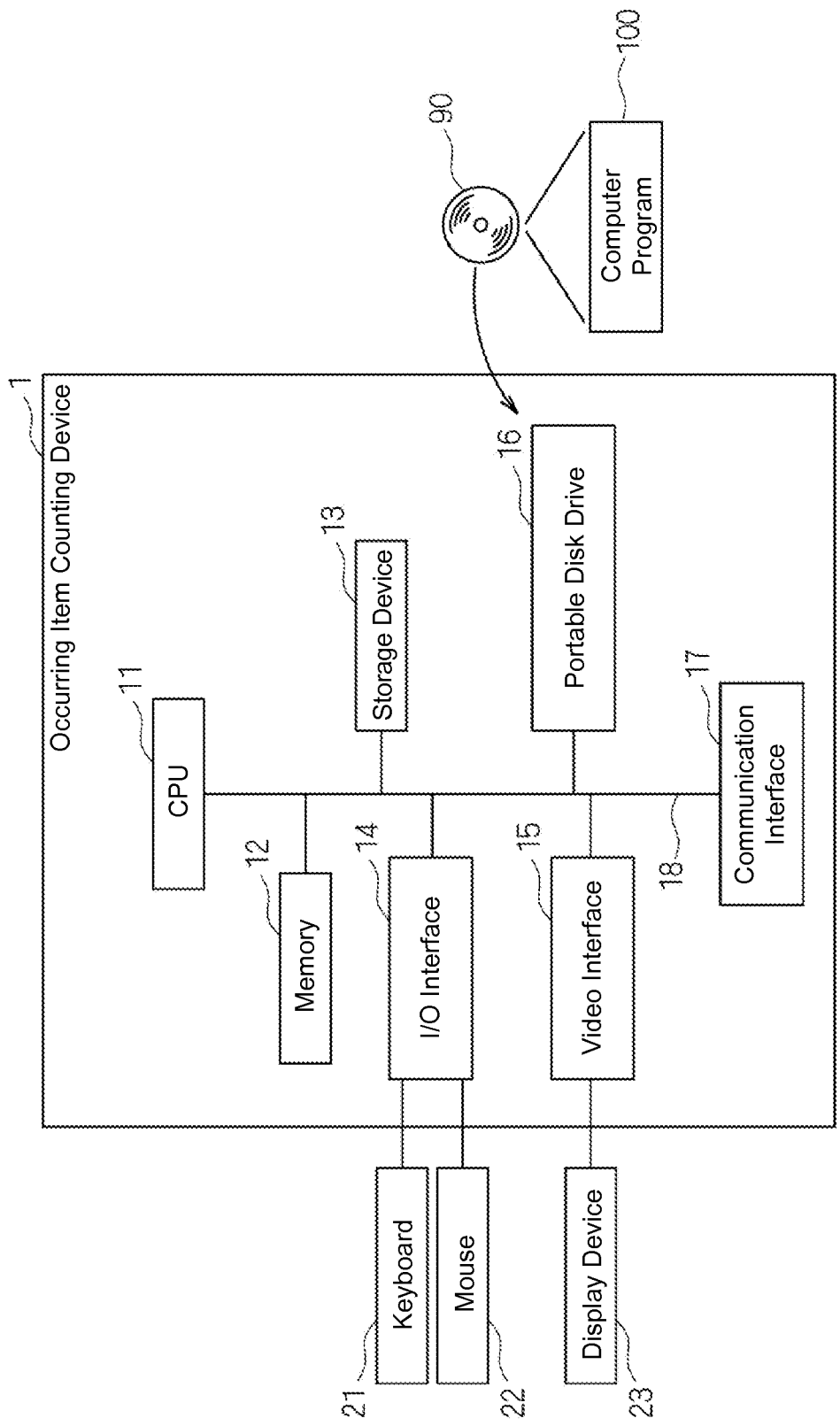
FIG. 1 is a block diagram schematically illustrating the configuration of the occurring item counting device according to an embodiment of the present invention.

The following is a detailed description with reference to the drawings of an occurring item counting device according to an embodiment of the present invention. The present invention can identify items with a high frequency of occurrence among items included in a text data stream. The present invention is not limited to the description of the present embodiment. Many variations, improvements and embodiments are possible within the scope of the present invention. For example, in the embodiment described below, identification information for identifying an item and the item count were stored in the highest level of memory. However, they do not have to be stored in the highest level of memory if a memory structure with a plurality of levels can distinguish between a higher level and a lower level. Also, the present embodiment does not limit the present invention in the scope of the claims and all combinations of characteristics explained in the present embodiment are not necessarily required in the technical solution of the present invention.

To achieve the purpose of the present invention, a first aspect of the present invention is a method for identifying items having a high frequency of occurrence among items included in a text data stream using a computer system having memory with a plurality of levels, in which the computer system includes: storing identification information for identifying an item and a count of items in a higher level of memory in the memory with a plurality of levels, and storing only identification information in a lower level of memory below the higher level of memory in the memory with a plurality of levels, and in which the method includes the steps of: receiving text data stream input, and increasing the increment of the count of an item in response to storage in the higher level memory of identification information for an item included in a bucket divided from the received text data stream input, transferring identification information for the item along with the initial count to the higher level of memory in response to storage in the lower level of memory, and newly storing the identification information for the item along with the initial count in the higher level of memory in response to not being stored on any level.

A second aspect of the present invention is the method in the first aspect of the present invention, in which a count error is associated with the identification information and stored in the higher level of memory, and in which the method also includes the steps of: calculating the count per bucket for each item corresponding to identification information stored in the higher level of the memory on the basis of the count stored in the higher level of the memory and the error; and transferring the identification information for an item to the lower level of memory in response to the calculated count per bucket being smaller than a first threshold value.

A third aspect of the present invention is the method in the second aspect of the present invention, in which the first threshold value is a bucket number, and the bucket number is the current count for the frequency of occurrence for an item.

A fourth aspect of the present invention is the method in any one of the first through third aspects of the present invention, in which the method also includes the step of removing from the higher level of memory and from the lower level of memory the identification information for an item in response to the count for the item being smaller than a second threshold value.

A fifth aspect of the present invention is the method in any one of the first through fourth aspects of the present invention, in which the higher level of memory is the highest level of memory in the memory with a plurality of levels.

A sixth aspect of the present invention is a device for identifying items having a high frequency of occurrence among items included in a text data stream, in which the device includes: a memory with a plurality of levels, and a data structure for storing identification information for identifying an item and a count of items in the higher level of memory in the memory with a plurality of levels, and for storing only identification information in a lower level of memory below the higher level of memory in the memory with a plurality of levels; and in which the device includes: an input receiving means for receiving text data stream input, and a storage memory controlling means for increasing the increment of the count of an item in response to storage in the higher level memory of identification information for an item included in a bucket divided from the received text data stream input, for transferring identification information for the item along with the initial count to the higher level of memory in response to storage in the lower level of memory, and for newly storing the identification information for the item along with the initial count in the higher level of memory in response to not being stored on any level.

A seventh aspect of the present invention is the device in the sixth aspect of the present invention, in which a count error is associated with the identification information and stored in the higher level of memory, and in which the device also includes: a calculating means for calculating the count per bucket for each item corresponding to identification information stored in the higher level of the memory on the basis of the count stored in the higher level of the memory and the error; and an inter-memory transferring means for transferring the identification information for an item to the lower level of memory in response to the calculated count per bucket being smaller than a first threshold value.

An eighth aspect of the present invention is the device in the seventh aspect of the present invention, in which the first threshold value is a bucket number, and the bucket number is the current count for the frequency of occurrence for an item.

A ninth aspect of the present invention is the device in any one of the sixth through eighth aspects of the present invention, in which the method further includes a removing means for removing from the higher level of memory and from the lower level of memory the identification information for an item in response to the count for the item being smaller than a second threshold value.

A tenth aspect of the present invention is the device in any one of the sixth through ninth aspects of the present invention, in which the higher level of memory is the highest level of memory in the memory with a plurality of levels.

An eleventh aspect of the present invention is a computer program executable by a device for identifying items having a high frequency of occurrence among items included in a text data stream, in which the device includes: a memory with a plurality of levels, and a data structure for storing identification information for identifying an item and a count of items in the higher level of memory in the memory with a plurality of levels, and for storing only identification information in a lower level of memory below the higher level of memory in the memory with a plurality of levels; and in which the computer program executes in the device the functions of: an input receiving means for receiving text data stream input, and a storage memory controlling means for increasing the increment of the count of an item in response to storage in the higher level memory of identification information for an item included in a bucket divided from the received text data stream input, for transferring identification information for the item along with the initial count to the higher level of memory in response to storage in the lower level of memory, and for newly storing the identification information for the item along with the initial count in the higher level of memory in response to not being stored on any level.

A twelfth aspect of the present invention is the computer program in the eleventh aspect of the present invention, in which a count error is associated with the identification information and stored in the higher level of memory, and in which the computer program executing in the device the functions of: a calculating means for calculating the count per bucket for each item corresponding to identification information stored in the higher level of the memory on the basis of the count stored in the higher level of the memory and the error; and an inter-memory transferring means for transferring the identification information for an item to the lower level of memory in response to the calculated count per bucket being smaller than a first threshold value.

A thirteenth aspect of the present invention is the computer program in the twelfth aspect of the present invention, in which the first threshold value is a bucket number, and the bucket number is the current count for the frequency of occurrence for an item.

A fourteenth aspect of the present invention is the computer program in any one of the eleventh through thirteenth aspects of the present invention, in which the device functions as a removing means for removing from the higher level of memory and from the lower level of memory the identification information for an item in response to the count for the item being smaller than a second threshold value.

A fifteenth aspect of the present invention is the device in any one of the eleventh through fourteenth aspects of the present invention, in which the higher level of memory is the highest level of memory in the memory with a plurality of levels.

In an embodiment of the present invention, a large-volume text data stream whose data cannot all be stored in memory is divided into buckets of a predetermined size, the occurrences of the items included in each divided bucket are counted successively and only identification information for items with a low frequency of occurrence is stored. In this way, items with a high frequency of occurrence can be identified with accuracy and overall memory usage can be reduced.

In another embodiment, a device is used to introduce a computer program to a computer system. However, it should be clear to those skilled in the art that the present invention can also be embodied as a computer program that can be executed by a computer. Therefore, the occurring item counting device can be embodied as hardware, as software or as a combination of both hardware and software. The computer program can be recorded on any computer-readable recording medium, such as a hard disk, DVD, CD, optical storage device or magnetic storage device.

FIG. 1 is a block diagram schematically illustrating the configuration of the occurring item counting device in an embodiment of the present invention. The occurring item counting device 1 includes, at the least, a central processing unit (CPU) 11, memory 12, a storage device 13, an I/O interface 14, a video interface 15, a portable disk drive 16, a communication interface 17 and an internal bus 18 to connect these hardware elements.

The CPU 11 is connected to the hardware elements of the occurring item counting device 1 described above via the internal bus 18 in order to control the operation of these hardware elements and to execute various software functions according to the computer program 100 stored in the storage device 13. The memory 12 is configured from volatile memory, such as SRAM or SDRAM. During execution of the computer program 100, load modules are expanded in the memory and temporary data generated by the execution of the computer program 100 is stored in the memory.

Figure 2:
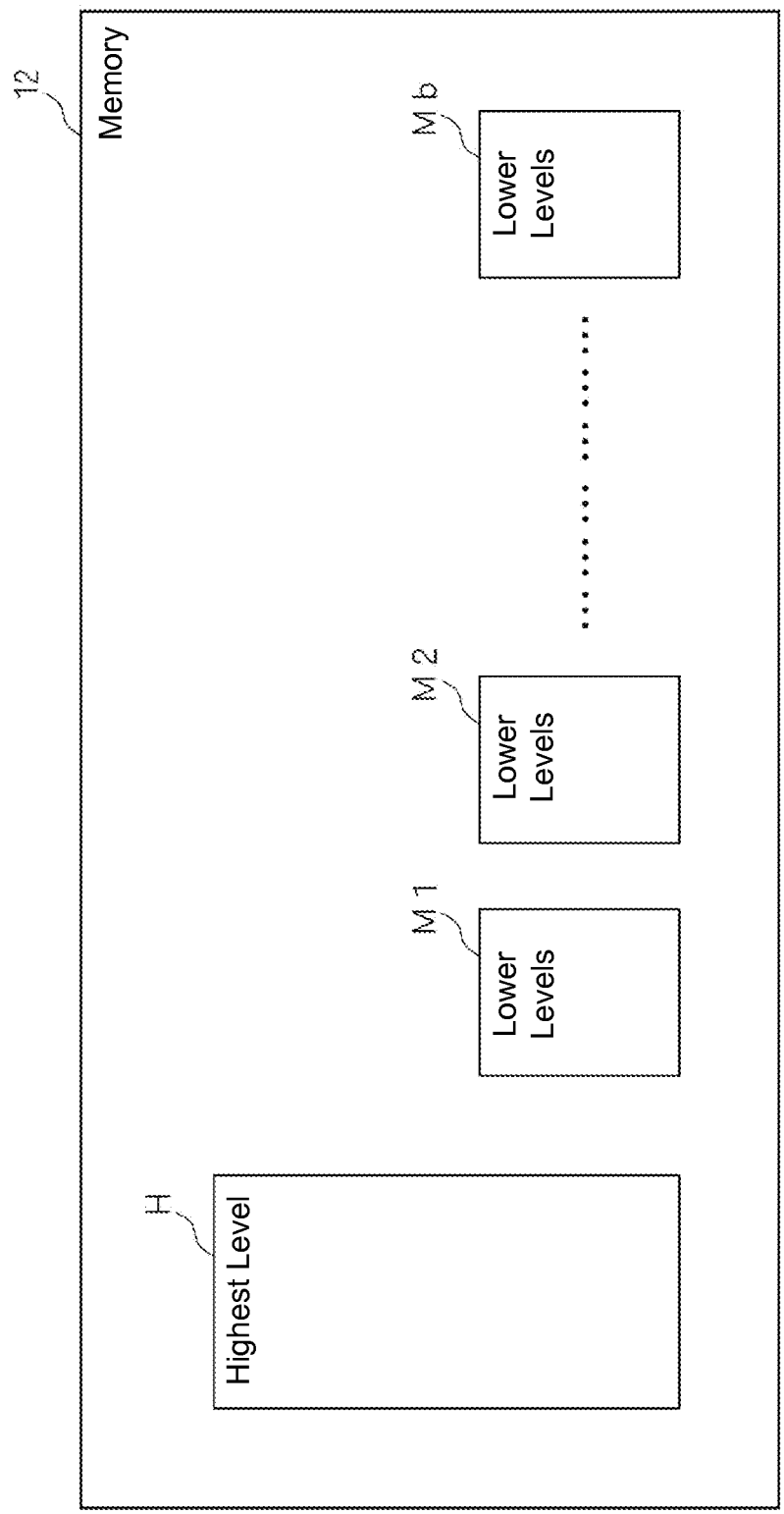
FIG. 2 is a block diagram illustrating the configuration of the memory in the occurring item counting device according to an embodiment of the present invention.

In the present embodiment, the memory 12 has a multi-level memory structure. At the very least, the memory has a two-level memory structure. FIG. 2 illustrates the configuration of the memory 12 in the occurring item counting device 1. As shown in FIG. 2, the memory 12 includes a highest level of memory H and a plurality of lower levels of memory M1, M2 . . . Mb (where b is a natural number). Identification information h for identifying items read from the data stream, the item count (a cumulative value of the number of occurrences) $f_h$ and the count error $\Delta_h$ are stored in the highest level of memory H. Only identification information h for identifying items is stored in the lower levels of memory M1, M2 . . . Mb. As described below, items are stored in the highest level of memory H or in the lower levels of memory M1, M2 . . . Mb on the basis of the item count $f_h$ and the count error $\Delta_h$. In this way, memory usage for reading items from the text data stream and for counting items can be greatly reduced.

Storage on each lower level of memory M1, M2 . . . Mb depends on the item count $f_h$ and the count error $\Delta_h$. In other words, storage on each lower level of memory M1, M2 . . . Mb is determined according to Equation 1 using a parameter θ for adjusting the number of items transferred to the lower levels of memory M1, M2 . . . Mb.

$$(b-1)\theta < f_h + \Delta_h \leq b\theta. \qquad \text{Equation 1:}$$

In Equation 1, $f_h$ is the item count for identification information h, $\Delta_h$ is the count error and storage to the various levels of memory is determined in accordance with the frequency of occurrence.

Returning to FIG. 1, the storage device 13 includes a built-in fixed storage device (hard disk) and ROM. The computer program 100 stored in the storage device 13 is downloaded to the portable disk drive 16 from a portable storage medium 90, such as a DVD or CD-ROM, on which information, such as the program and data, have been stored. During execution, this information is expanded in the memory 12 from the storage device 13 and executed. The computer program can also be downloaded from an external computer connected via the communication interface 17. The communication interface 17 is connected to the internal bus 18 and to an external network, such as the Internet, LAN or WAN, in order to exchange data with external computers. The I/O interface 14 is connected to input devices, such as a keyboard 21 and mouse 22, in order to receive data inputs. The video interface 15 is connected to a display device 23, such as a CRT display or a liquid crystal display, and a list of items is displayed on the display device 23 in descending order according to frequency of occurrence.

Figure 3:
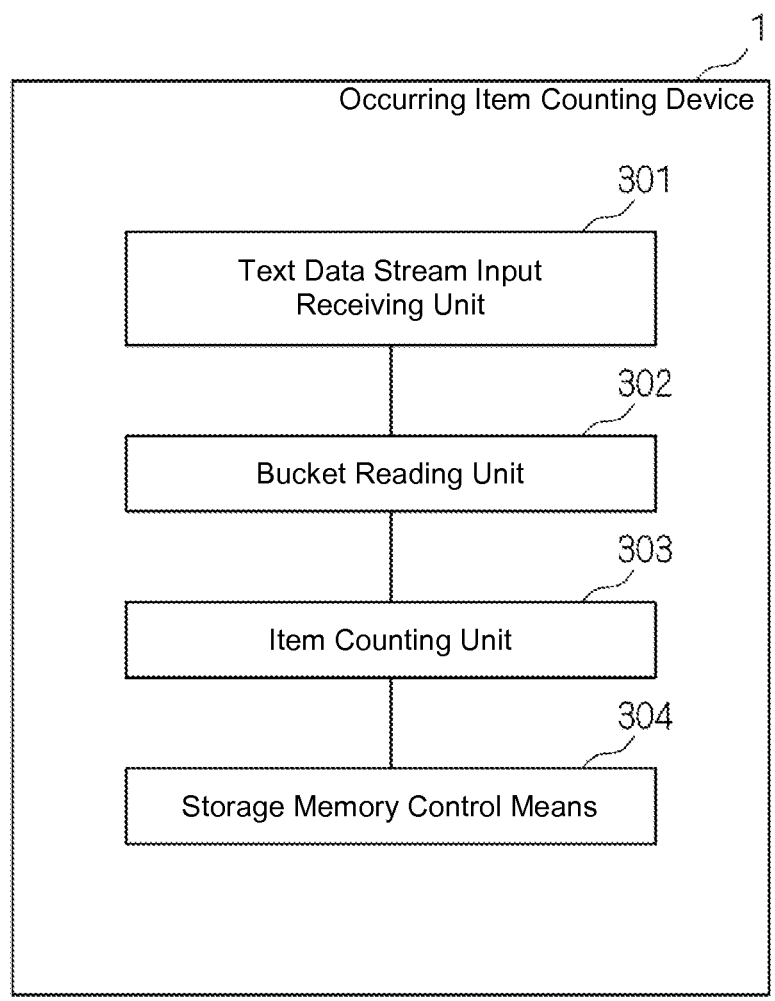
FIG. 3 is a function block diagram of the occurring item counting device according to an embodiment of the present invention.

FIG. 3 is a function block diagram of the occurring item counting device 1 in an embodiment of the present invention. In FIG. 3, the text data stream input receiving unit 301 (input receiving means) receives input of a text data stream that includes a large number of items. In order to efficiently count the number of occurrences of each item the stream is divided into buckets of a predetermined size, the items included in each bucket are read and the number of occurrences of each item is counted. In other words, the bucket reading unit 302 divides a received text data stream into buckets of a predetermined size and reads the items included in each bucket. The item counting unit 303 counts the number of occurrences of each item that has been read.

The storage memory control unit (storage memory control means) 304 controls the storage format of the memory so that the identification information h for an item that has been read from the text data stream is stored in the highest level of memory H or a lower level of memory M1, M2 . . . Mb. In other words, when identification information h for an item that has been read has already been stored in the highest level of memory H, the item is deemed to have already been recognized as an item with a high frequency of occurrence or as the item that most recently appeared. Therefore, the highest level of memory H is updated so that the count $f_h$ associated with identification information h for the item stored in the highest level of memory H is increased by a single increment '1.'

When the identification information h for an item that has been read is stored in a lower level of memory M1, M2 . . . Mb, the item is identified as stored in a lower level of memory, the identification information h for the item is removed from the identified lower level of memory, an initial count of '1' is set and the identification information h for the item is transferred to the highest level of memory H along with the initial count '1.' In this case, the count error $\Delta_h$ is calculated based on which lower level of memory the information had been stored in. In other words, when identification information h for an item that has been read has been stored in the $b^{th}$ lower level of memory Mb, the count error $\Delta_h$ is calculated according to Equation 2.

$$\Delta_h = (b-1/2)\theta. \qquad \text{Equation 2:}$$

Therefore, an item with the data structure shown in Equation 3 is stored in the highest level of memory H.

$$H \rightarrow (h, 1, (b-1/2)\theta). \qquad \text{Equation 3:}$$

When identification information h for an item that has been read is not stored in either the highest level of memory H or in a lower level of memory M1, M2 . . . Mb, or in other words when the item is an item that has appeared for the first time, the identification information h for the item is newly stored in the highest level of memory H along with an initial count value of '1' and a count error of '0.'

Figure 4:
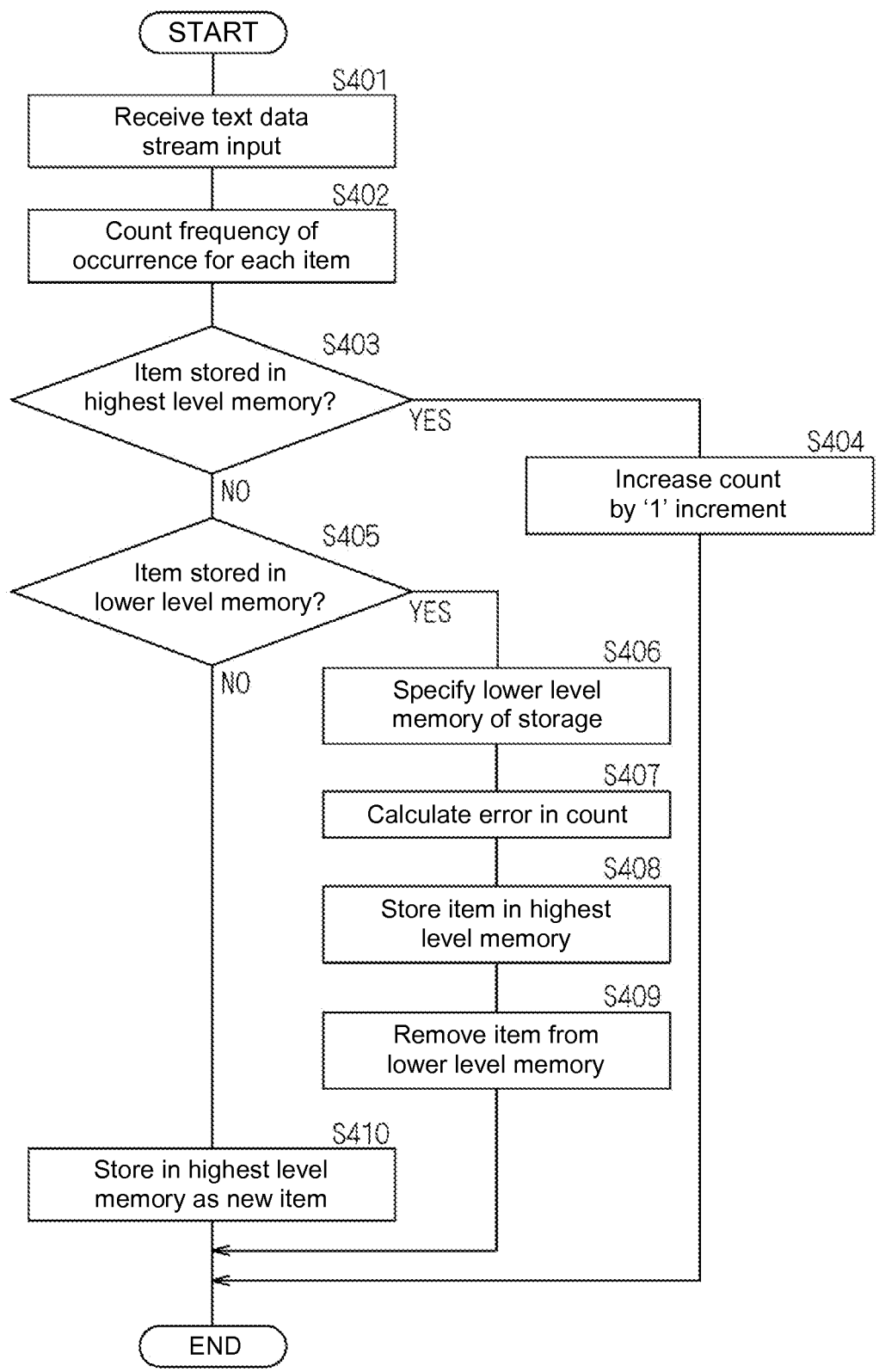
FIG. 4 is a flowchart illustrating the steps of item storage processing performed by the CPU of the occurring item counting device according to an embodiment of the present invention.

FIG. 4 is a flowchart illustrating the steps of item storage processing performed by the CPU 11 of the occurring item counting device 1 in an embodiment of the present invention. In FIG. 4, the CPU 11 of the occurring item counting device 1 receives text data stream input that includes a large number of items (Step S401). In order to efficiently count the number of occurrences of each item the stream is divided into buckets of a predetermined size and the number of occurrences of the items in each bucket is counted (Step S402).

The CPU 11 determines whether an item that has been read (more precisely, the identification information h, but this has been abbreviated as "item") is stored in the highest level of memory H (Step S403). When the CPU 11 has determined that the item is stored in the highest level of memory H (Step S403: YES), the CPU 11 increases the count $f_h$ associated with the item stored in the highest level of memory H by a single increment '1' (Step S404). When the CPU 11 has determined that the item is not stored in the highest level of memory H (Step S403: NO), the CPU 11 determines whether the item that has been read is stored in a lower level of memory M1, M2 . . . Mb (Step S405).

When the CPU 11 has determined that the item is stored in a lower level of memory M1, M2 . . . Mb (Step S405: YES), the CPU 11 identifies which lower level of memory contains the item (Step S406). The CPU 11 calculates the count error $\Delta_h$ based on the identified lower level of memory (Step S407) and stores the calculated count error $\Delta_h$, the identification information h for the item and an initial count of '1' in the highest level of memory H as the data set related to the item (Step S408). The CPU 11 then removes the item from the lower level of memory M1, M2 . . . Mb (Step S409).

When the CPU 11 determines that the item is not stored in any of the lower levels of memory M1, M2 . . . Mb (Step S405: NO), the item is newly stored along with an initial count of '1' in the highest level of memory H (Step S410).

Thus, the number of occurrences of items contained in a text data stream can be counted accurately even when stored in memory having a plurality of levels. While only identification information h for items is stored in the lower levels of memory M1, M2 . . . Mb, the count $f_h$ can be easily estimated within a certain range in response to which level of memory the information was stored in.

Figure 5:
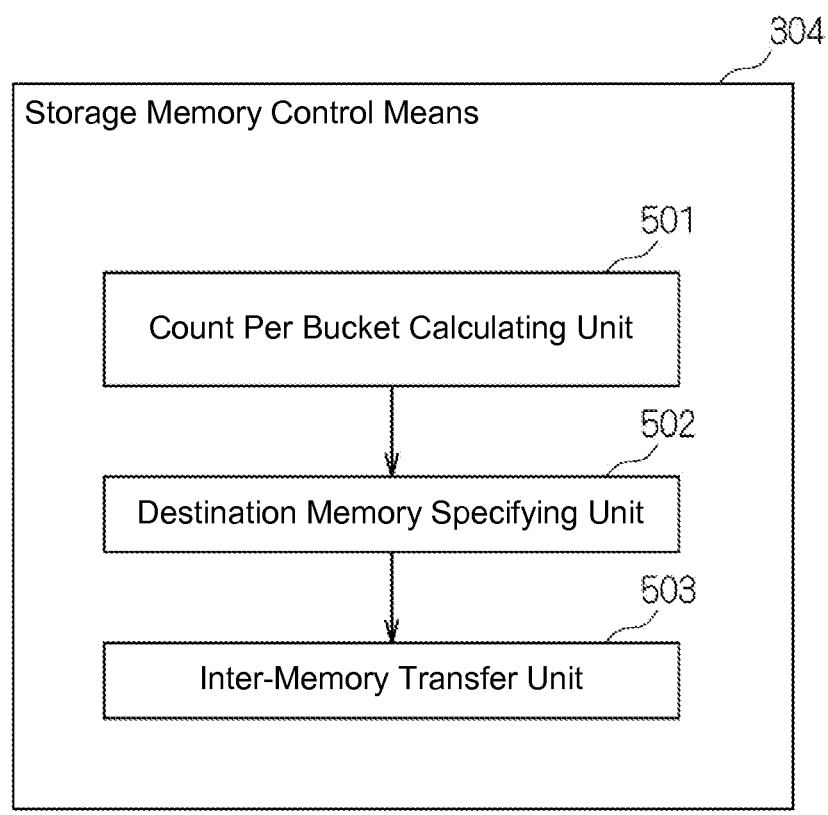
FIG. 5 is a function block diagram of the storage memory control unit of the occurring item counting device according to an embodiment of the present invention.

As this processing is repeated, the number of items in the highest level of memory H increases. When a fixed number of items have been processed, the items with a small number of occurrences have to be transferred to the lower levels of memory M1, M2 . . . Mb. FIG. 5 is a function block diagram of the storage memory control unit 304 of the occurring item counting device 1 in an embodiment of the present invention. In FIG. 5, the storage memory control unit 304 includes a count per bucket calculating unit 501 (calculating means), a destination memory specifying unit 502 and an inter-memory transfer unit 532 (inter-memory transferring means).

The count per bucket calculating unit 501 reads the identification information h for an item stored in the highest level of memory H and calculates the count per bucket based on the associated count $f_h$ and the count error $\Delta_h$ stored therein. More specifically, it reads the stored data set (h, $f_h$, $\Delta_h$) for the item.

Next, the count per bucket b is calculated according to Equation 4. In Equation 4, the number of items transferred to the lower level memory M1, M2 . . . Mb can be adjusted using parameter θ.

$$b = (f_h + \Delta_h)/\theta. \qquad \text{Equation 4:}$$

The destination memory specifying unit 502 determines whether or not the calculated count per bucket is smaller than a first threshold value and specifies the lower level of memory to which the item is to be transferred when smaller. In other words, which lower level of memory M1, M2 . . . Mb is determined based on the calculated count per bucket b. Only identification information h for items is stored in the lower levels of memory M1, M2 . . . Mb. However, by specifying which level based on the count per bucket b, the frequency of occurrence for the item can be estimated based on the level of memory in which the information is stored.

The item count $f_h$ stored in a lower level of memory Mb can be greater than $(b-1)\theta$ and less than or equal to $b\theta$ as shown in Equation 1. Therefore, the destination lower level of memory can be uniquely specified using the count per bucket b for the item stored in the highest level of memory H.

The inter-memory transferring unit 503 stores the identification information h for the item in the specified lower level of memory and removes the identification information h for the item from the highest level of memory H. In this way, the item is transferred to a lower level of memory.

FIG. 6 is a diagram illustrating the process for determining whether or not an item has been transferred from the highest level memory H to a lower level memory M1, M2 . . . Mb. In FIG. 6, the current bucket number bcurr is '500,' the length of each bucket is '1000' and θ is '20.' Here, 500,000 (=500× 1000) items are processed until the items included in the current bucket have been read and the number of occurrences for each item has been counted.

First, the sum of the count $f_h$ and the error $\Delta_h$ is calculated for each item stored in the highest level of memory H. In FIG. 6(a), $(f_h+\Delta_h)$ is '1000' so the count per bucket b is '50' (=1000/20). When the count per bucket for an item is equal to or greater than the current bucket number bcurr, the frequency of occurrence is deemed to be high. Once this has been established it is determined whether the count per bucket b for the item is smaller than the current bucket number bcurr and whether or not the item is to be transferred to a lower level of memory M1, M2 . . . Mb. In other words, when the count per bucket b is equal to or greater than the current bucket number bcurr the item is deemed to have a high frequency of occurrence and the identification information for the item is stored in the highest level of memory H. When the count per bucket b is less than the current bucket number bcurr the item is deemed to have a low frequency of occurrence and the identification information for the item is stored in a lower level of memory M1, M2 . . . Mb.

In FIG. 6(a), the calculated count per bucket b '50' is smaller than the current bucket number bcurr (=500). Therefore, the item is deemed to have a low frequency of occurrence and the identification information h for the item is transferred to a lower level of memory M1, M2 . . . Mb. In FIG. 6(b), $(f_h+\Delta_h)$ is '100,000' so the calculated count per bucket b is '5000' (=100,000/20), which is larger than the current bucket number bcurr (=500). Therefore, the item is deemed to have a high frequency of occurrence and the identification information h for the item remains stored in the highest level of memory H.

Figure 7:
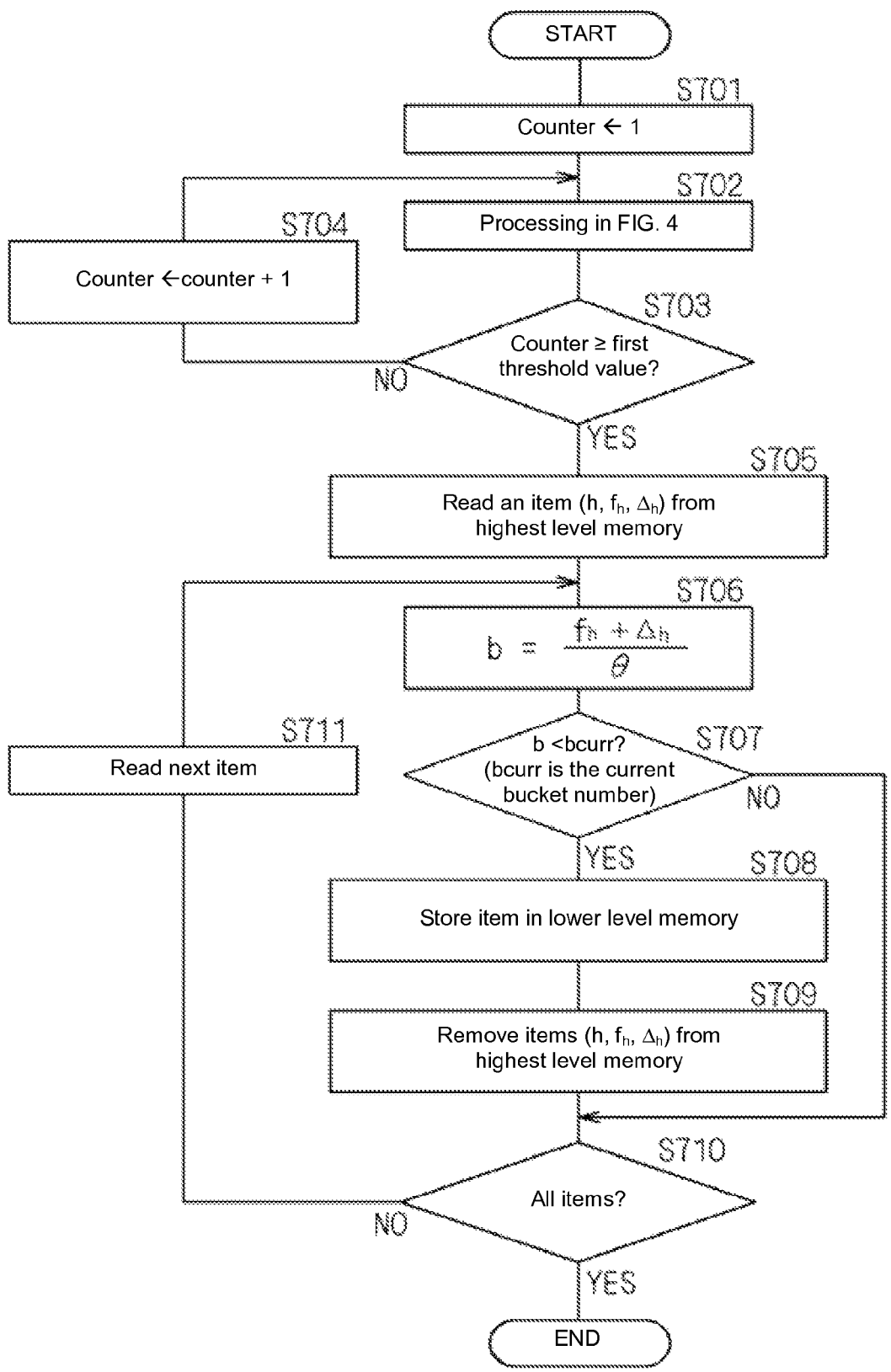
FIG. 7 is a flowchart illustrating the steps of the inter-memory transfer processing performed by the storage memory control unit of the occurring item counting device according to an embodiment of the present invention.

FIG. 7 is a flowchart illustrating the steps of the inter-memory transfer processing performed by the storage memory control unit 304 of the occurring item counting device 1 in an embodiment of the present invention. In FIG. 7, the CPU 11 in the occurring item counting device 1 sets the counter for counting the number of processed items to an initial value of '1' (Step S701) and executes the processing shown in FIG. 4 (Step S702). Then the CPU 11 determines whether or not the counter is equal to or greater than a first threshold value (Step S703). The storage capacity for the item to be stored in a lower level of memory is determined based on the size of the first threshold value.

When the CPU 11 has determined that the counter is smaller than the first threshold value (Step S703: NO), the CPU 11 increases the counter by a single increment '1' (Step S704), returns the process to Step S702 and repeats the process described above. When the CPU 11 has determined that the counter is equal to or greater than the first threshold value (Step S703: YES), the CPU 11 reads an item stored in the highest level of memory H (Step S705). More specifically, the set of stored data $(h, f_h, \Delta_h)$ for a stored item is read.

The CPU 11 calculates the counter per bucket b according to (Equation 4) based on the stored count $f_h$ and count error $\Delta_h$ associated with the item (more precisely, the identification information h, but this has been abbreviated as "item" such as in FIG. 4) (Step S706). The CPU 11 then determines whether or not the calculated count per bucket b is smaller than the current bucket number bcurr (Step S707). When the CPU 11 has determined that the calculated count per bucket b is smaller than the current bucket number bcurr (Step S707: YES), the CPU 11 determines that the item is to be stored in a lower level of memory M1, M2 . . . Mb (Step S708) and removes the set of stored data $(h, f_h, \Delta_h)$ for the item from the highest level of memory H (Step S709). When the CPU 11 has determined that the calculated count per bucket b is equal to or greater than the current bucket number bcurr (Step S707: NO), the CPU 11 skips the processing in Step S708 and Step S709 and determines whether or not all of the items stored in the highest level of memory H have been read (Step S710).

When the CPU 11 has determined that there are unread items remaining (Step S710: NO), the CPU 11 reads the next item from the highest level of memory H (Step S711), returns the process to Step S706 and repeats the processing described above. When the CPU 11 has determined that all of the items have been read (Step S710: YES), the CPU 11 ends the process.

By transferring items stored in the highest level of memory M to lower levels of memory M1, M2 . . . Mb based on the frequency of occurrence at predetermined intervals of time while the number of processed items is being counted, the number of items stored in the highest level of memory H can be kept below a fixed number and memory usage can be reduced significantly.

When the number of occurrences is smaller than a predetermined number, it is considered meaningless to store an item. When $(f_h+\Delta_h)/\theta$ is smaller than a second threshold value, for example ¼ of the current bucket number bcurr, the identification information h for the item can be removed from both the highest level of memory H and the lower levels of memory M1, M2 . . . Mb. Because identification numbers for unneeded items do not have to be stored, even more memory capacity can be freed up.

In the embodiment described above, a large-volume text data stream whose data cannot all be stored in memory is divided into buckets of a predetermined size, the occurrences of the items included in each divided bucket are counted successively and only identification information for items with a low frequency of occurrence is stored. In this way, items with a high frequency of occurrence can be identified with accuracy and overall memory usage can be reduced.

The present invention is not restricted to a two-stage memory structure including a highest level of memory H and lower levels of memory M1, M2 . . . Mb. For example, items with a very low number of occurrences can be stored in the lowest level of memory instead of being deleted. Preferably, the highest level of memory H is memory with a hash map structure to enable relatively high-speed access and the lower level of memory M1, M2 . . . Mb is memory with a double-array structure. This enables the overall access speed to be increased. The lowest level of memory can be memory with a tree structure, such as LOUDS. In this way, the lowest level of memory does not cause any problems related to access speed.

We claim:

1. A computer implemented method for identifying items having a high frequency of occurrence among items included in a text data stream, wherein the computer includes a processor communicatively coupled to a memory having a plurality of levels, wherein the memory stores identification information for identifying an item and a count of items in a higher level of the memory and stores only identification information in a lower level of the memory, the method comprising the steps of:

receiving text data stream input;

reading each item and counting the number of occurrences for each item in a bucket divided from the received text data stream input;

increasing an increment of the count of an item in response to storing, in said higher level memory, identification information for an item included in said bucket divided from the received text data stream input;

transferring identification information for the item along with an initial count to said higher level of memory in response to storing said identification information for an item in said lower level of memory; and newly storing the identification information for the item along with the initial count in said higher level of memory in response to not being stored on any level.

2. The method according to claim 1, wherein a count error is associated with the identification information and stored in said higher level of memory, and the method further comprising the steps of:

calculating the count per bucket for each item corresponding to identification information stored in said higher level of the memory on the basis of the count stored in said higher level of the memory and said count error; and transferring the identification information for an item to said lower level of memory in response to the calculated count per bucket being smaller than a first threshold value.

3. The method according to claim 2, wherein said first threshold value is a bucket number, said bucket number being the current count for a frequency of occurrence for an item.

4. The method according to claim 1, further comprising the step of removing from said higher level of memory and from said lower level of memory the identification information for an item in response to the count for the item being smaller than a second threshold value.

5. The method according to claim 1, wherein said higher level of memory is the highest level of memory in said memory with a plurality of levels.

6. The method according to claim 1, wherein a count error is associated with the identification information and stored in said higher level of memory.

7. A device for identifying items having a high frequency of occurrence among items included in a text data stream, comprising:

a memory with a plurality of levels, which stores identification information for identifying an item and a count of items in a higher level of the memory and stores only identification information in a lower level the memory;

an input receiving means for receiving text data stream input; and a storage memory controlling means for increasing the increment of the count of an item in response to storing, in said higher level memory, identification information for an item included in a bucket divided from said received text data stream input, for transferring identification information for the item along with an initial count to said higher level of memory in response to storing said identification information for an item in said lower level of memory and for newly storing the identification information for the item along with the initial count in said higher level of memory in response to the item not being stored on any level.

8. The device according to claim 7, wherein a count error is associated with the identification information and stored in said higher level of memory, and further comprising:

a calculating means for calculating the count per bucket for each item corresponding to identification information stored in said higher level of the memory on the basis of the count stored in said higher level of the memory and said count error; and an inter-memory transferring means for transferring the identification information for an item to said lower level of memory in response to the calculated count per bucket being smaller than a first threshold value.

9. The device according to claim 8, wherein said first threshold value is a bucket number, said bucket number being the current count for a frequency of occurrence for an item.

10. The device according to claim 7, further comprising a removing means for removing from said higher level of memory and from said lower level of memory the identification information for an item in response to the count for the item being smaller than a second threshold value.

11. The device according to claim 7, wherein said higher level of memory is the highest level of memory in said memory with a plurality of levels.

12. A system for identifying items having a high frequency of occurrence among items included in a text data stream the system comprising:

a memory with a plurality of levels, which stores identification information for identifying an item and a count of items in a higher level of the memory and stores only identification information in a lower level of memory below said higher level of memory;

a processor in communication with said memory; and a module for executing the functions of:

an input receiving means for receiving text data stream input; and a storage memory controlling means:

for increasing the increment of the count of an item in response to storing, in said higher level memory, identification information for an item included in a bucket divided from said received text data stream input;

for transferring identification information for the item along with an initial count to said higher level of memory in response to storing said identification information for an item in said lower level of memory; and for newly storing the identification information for the item along with the initial count in said higher level of memory in response to not being stored on any level.

13. The system according to claim 12, wherein said higher level of memory is the highest level of memory in said memory with a plurality of levels.

14. The system according to claim 13, wherein a count error is associated with the identification information and stored in said higher level of memory and wherein said computer program executing in said device the functions of:

a calculating means for calculating the count per bucket for each item corresponding to identification information stored in said higher level of the memory on the basis of the count stored in said higher level of the memory and said count error; and an inter-memory transferring means for transferring the identification information for an item to said lower level of memory in response to the calculated count per bucket being smaller than a first threshold value.

15. The system according to claim 14, wherein said first threshold value is a bucket number, said bucket number being the current count for a frequency of occurrence for an item.

16. The system according to claim 12, wherein the device functions as a removing means for removing from said higher level of memory and from said lower level of memory the identification information for an item in response to the count for the item being smaller than a second threshold value.

17. A computer readable storage medium tangibly embodying a computer readable non-transitory program code having computer readable instructions which, when implemented, cause a computer to carry out the steps of the method for identifying items having a high frequency of occurrence among items included in a text data stream, wherein the computer includes a processor communicatively coupled to a memory having a plurality of levels, wherein the memory stores identification information for identifying an item and a count of items in a higher level of the memory and stores only identification information in a lower level of the memory, the method comprising the steps of:

receiving text data stream input;

reading each item and counting the number of occurrences for each item in a bucket divided from the received text data stream input;

increasing an increment of the count of an item in response to storing, in said higher level memory, identification information for an item included in said bucket divided from the received text data stream input;

transferring identification information for the item along with an initial count to said higher level of memory in response to storing said identification information for an item in said lower level of memory; and newly storing the identification information for the item along with the initial count in said higher level of memory in response to not being stored on any level.

18. The computer readable storage medium according to claim 17, wherein a count error is associated with the identification information and stored in said higher level of memory, and the method further comprising the steps of:

calculating the count per bucket for each item corresponding to identification information stored in said higher level of the memory on the basis of the count stored in said higher level of the memory and said count error; and transferring the identification information for an item to said lower level of memory in response to the calculated count per bucket being smaller than a first threshold value.

19. The computer readable storage medium according to claim 17, wherein said first threshold value is a bucket number, said bucket number being the current count for a frequency of occurrence for an item.

20. The computer readable storage medium according to claim 17, further comprising the step of removing from said higher level of memory and from said lower level of memory the identification information for an item in response to the count for the item being smaller than a second threshold value.

* * * * *